(12) United States Patent
Park et al.

(10) Patent No.: US 10,697,899 B1
(45) Date of Patent: Jun. 30, 2020

(54) METHOD AND APPARATUS FOR DETERMINING TOOL MARK IDENTITY USING MACHINE LEARNING

(71) Applicant: REPUBLIC OF KOREA (NATIONAL FORENSIC SERVICE DIRECTOR MINISTRY OF PUBLIC ADMINISTRATION AND SECURITY), Wonju-si, Gangwon-do (KR)

(72) Inventors: Nam Kyu Park, Bucheon-si (KR); Jae Mo Goh, Wonju-si (KR); Jin Pyo Kim, Daejeon (KR); Young Il Seo, Wonju-si (KR); Eun Ah Joo, Yongin-si (KR); Je Hyun Lee, Wonju-si (KR); Sang Yoon Lee, Wonju-si (KR); Dong A Lim, Daejeon (KR); Kyung Mi Kim, Namyangju-si (KR)

(73) Assignee: REPUBLIC OF KOREA (MANAGEMENT NATIONAL FORENSIC SERVICE DIRECTOR, MINISTRY OF PUBLIC ADMINISTRATION AND SECURITY), Wonju-si, Gangwon-Do (KR)

( * ) Notice: Subject to any disclaimer, the term of this patent is extended or adjusted under 35 U.S.C. 154(b) by 0 days.

(21) Appl. No.: 16/689,553

(22) Filed: Nov. 20, 2019

(30) Foreign Application Priority Data

Aug. 19, 2019 (KR) ........................ 10-2019-0101027

(51) Int. Cl.
*G06N 20/00* (2019.01)
*G01N 21/88* (2006.01)
*G06K 9/62* (2006.01)

(52) U.S. Cl.
CPC ....... *G01N 21/8851* (2013.01); *G06K 9/6202* (2013.01); *G06K 9/6256* (2013.01); *G06N 20/00* (2019.01); *G01N 2021/8887* (2013.01)

(58) Field of Classification Search
CPC ........... G01N 21/8851; G01N 21/9501; G06N 20/00; G06K 9/00; G06K 9/6202
(Continued)

(56) References Cited

U.S. PATENT DOCUMENTS

2008/0240510 A1* 10/2008 Dale ........................ G06K 9/00
382/108
2019/0304851 A1* 10/2019 Smith ................ G01N 21/9501

FOREIGN PATENT DOCUMENTS

KR         10-1885066 B1    8/2018

OTHER PUBLICATIONS

[Supportive Materials for Exception to Loss of Novelty] Je Hyun Lee, "Statistical analysis of tool trace identity and machine learning judgment", The 35th Korean Society of Forensic Sciences 2018 Fall Conference, Nov. 30, 2018, The Korean Society of Forensic Sciences, Republic of Korea.

* cited by examiner

*Primary Examiner* — Hung Nguyen
(74) *Attorney, Agent, or Firm* — Hauptman Ham, LLP

(57) ABSTRACT

According to an embodiment, a method of determining tool mark identity using machine learning may include: obtaining surface height data of at least two tool strip marks by photographing tool strip marks generated using at least two tools with a three-dimensional (3D) microscope; generating a data set by calculating a cross-correlation coefficient for the surface height data of the tool strip marks; separating the data set into a training set for machine learning training and a test set for verifying a machine learning result; performing the machine learning training to determine whether the tool (Continued)

strip marks are identical using the training set; and verifying a result of the machine learning training using the test set.

7 Claims, 6 Drawing Sheets

(58) Field of Classification Search
USPC .................................................... 356/237.2
See application file for complete search history.

METHOD AND APPARATUS FOR DETERMINING TOOL MARK IDENTITY USING MACHINE LEARNING

CROSS-REFERENCE TO RELATED APPLICATION

This application claims the benefit of Korean Patent Application No. 10-2019-0101027, filed on Aug. 19, 2019, in the Korean Intellectual Property Office, the disclosure of which is incorporated herein in its entirety by reference.

BACKGROUND

1. Field

One or more embodiments relate to a method and an apparatus for determining tool mark identity using machine learning.

2. Description of the Related Art

Tool marks are marks formed by mutual contact of objects. The tool marks may be divided into cuts, impression, scratches, abrasion, striations, friction, and the like. When a screwdriver scratches the surface of an object or a lever is used to open the door, marks are left on the door trim. When cutting the object with a cutter, tool marks showing characteristics of the tool remain.

In a crime scene involving theft or explosives, analyzing which tools opened the vault, made explosives, etc., plays an important role in the investigation. Depending on whether the tool is a cutting tool or a crimping tool, or whether the tool is double-edged or single-edged, specific tool marks are left. These tool marks may be used to analyze which tool was used. In this way, tool marks in criminal cases play an important role in solving crime cases because it is possible to estimate criminal tools and actors from the tool marks.

When a tool suspected of being used by a suspect is found in a crime scene, the crime scene is reconstructed and tool marks are generated by the suspicious tool. By comparing features of the generated tool marks and tool marks taken from evidences found in the crime scene, it is possible to determine whether they are identical or not. When the generated tool marks are found to be identical to the tool marks taken from the evidences found at the crime scene, the suspect in the case is proved to have committed the crime using the tool. Determining whether or not the generated tool marks are the same as the tool marks found at the crime scene, it plays an important role in resolving the crime. Therefore, there is a continuing study on the determination of the identity of such tool marks.

[Prior art document] Korean Patent No. 10-1885066 (registered on Jul. 30, 2018)

SUMMARY

One or more embodiments include a method and an apparatus for determining tool mark identity using machine learning, which implements a process of obtaining a cross-correlation coefficient for surface height data of at least two tool strip marks and determining whether tool strip marks are identical by machine learning.

According to an embodiment, a method of determining tool mark identity using machine learning includes: obtaining surface height data of at least two tool strip marks by photographing tool strip marks generated using at least two tools with a three-dimensional (3D) microscope; generating a data set by calculating a cross-correlation coefficient for the surface height data of the tool strip marks; separating the data set into a training set for machine learning training and a test set for verifying a machine learning result; performing the machine learning training to determine whether the tool strip marks are identical using the training set; and verifying a result of the machine learning training using the test set.

According to an embodiment, the obtaining of the surface height data of the tool strip marks may include: generating a 3D planar image of the tool strip marks by photographing the tool strip marks generated using the at least two tools with the 3D microscope; converting the 3D planar image of the tool strip marks into a 3D stereoscopic image of the tool strip marks by performing a 3D plotting process; and converting the 3D stereoscopic image of the tool strip marks into the surface height data of the tool strip marks.

According to an embodiment, the generating of the data set may include: generating a cross-correlation coefficient set AA for surface height data of two tool strip marks generated by a first tool, a cross-correlation coefficient set BB for surface height data of two tool strip marks generated by a second tool, and a cross-correlation coefficient set AB for the surface height data of the two tool strip marks respectively generated by the first tool and the second tool, and each data set generated based on each of the cross-correlation coefficient sets may be generated by storing the cross-correlation coefficient in a first column, and by storing a value of 1 in the case of tool strip marks generated by the same tool and a value of 0 in the case of tool strip marks generated by different tools in a second column.

According to an embodiment, the performing of the machine learning training may include: a linear discriminant analysis using a Matlab's classification learner.

According to an embodiment, an apparatus for determining tool mark identity using machine learning includes: a data acquisition unit configured to obtain surface height data of at least two tool strip marks by photographing tool strip marks generated using at least two tools with a 3D microscope; a data set generation unit configured to generate a data set by calculating a cross-correlation coefficient for the surface height data of the tool strip marks; a data set separation unit configured to separate the data set into a training set for machine learning training and a test set for verifying a machine learning result; a machine learning training unit configured to perform machine learning training to determine whether the tool strip marks are identical using the training set; and a machine learning verification unit configured to verify a result of the machine learning training using the test set.

According to an embodiment, the data acquisition unit may include: a 3D planar image generation unit configured to generate a 3D planar image of the tool strip marks by photographing the tool strip marks generated using the at least two tools with the 3D microscope; a 3D stereoscopic image conversion unit configured to convert the 3D planar image of the tool strip marks into a 3D stereoscopic image of the tool strip marks by performing a 3D plotting process; and a data conversion unit configured to convert the 3D stereoscopic image of the tool strip marks into the surface height data of the tool strip marks.

According to an embodiment, the data set generation unit may generate a cross-correlation coefficient set AA for surface height data of two tool strip marks generated by a first tool, a cross-correlation coefficient set BB for surface height data of two tool strip marks generated by a second tool, and a cross-correlation coefficient set AB for the surface height data of the two tool strip marks respectively generated by the first tool and the second tool, and each data set generated based on each of the cross-correlation coefficient sets may be generated by storing the cross-correlation coefficient in a first column, and by storing a value of 1 in the case of tool strip marks generated by the same tool and a value of 0 in the case of tool strip marks generated by different tools in a second column.

Additional aspects will be set forth in part in the description which follows and, in part, will be apparent from the description, or may be learned by practice of the presented embodiments.

According to an embodiment, a quantitative and unified discrimination criterion may be provided in determining whether tool marks are identical by implementing a process of obtaining a cross-correlation coefficient for surface height data of at least two tool strip marks and determining whether the tool marks are identical by machine learning.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
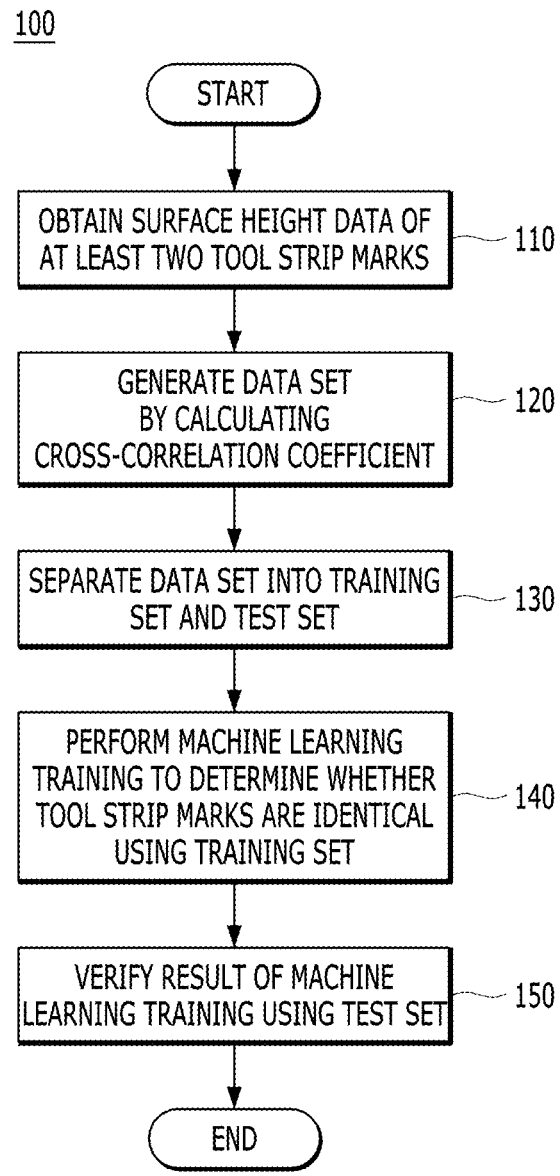
FIG. 1 is a flowchart illustrating a method of determining tool mark identity using machine learning, according to an embodiment.

Hereinafter, embodiments of the disclosure will be described in detail with reference to the accompanying drawings. The same reference numerals are used to denote the same elements, and repeated descriptions thereof will be omitted.

It will be understood that although the terms "first", "second", etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of components in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist, such that the layer, region, or component may be indirectly connected to the portion. For example, when a layer, region, or component is electrically connected to another portion, the layer, region, or component may be directly electrically connected to the portion or may be indirectly connected to the portion through another layer, region, or component.

Hereinafter, a method of determining tool mark identity using machine learning according to an embodiment will be described with reference to FIGS. 1 to 7.

Figure 2:
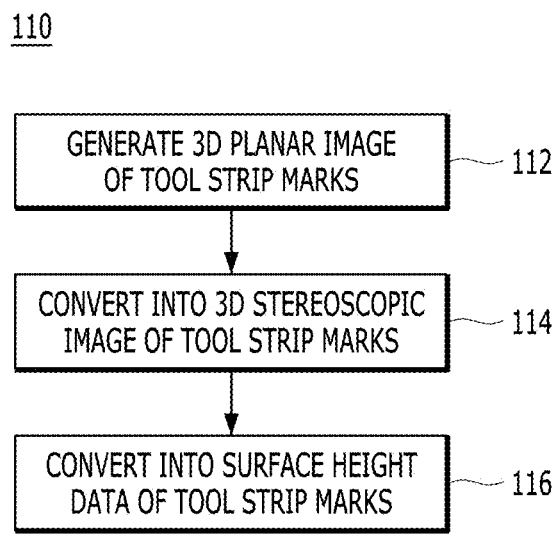
FIG. 2 is a flowchart illustrating the operation of obtaining surface height data of tool strip marks, according to an embodiment.

FIG. 1 is a flowchart illustrating a method of determining tool mark identity using machine learning, according to an embodiment. FIG. 2 is a flowchart illustrating the operation of obtaining surface height data of tool strip marks, according to an embodiment.

Referring to FIG. 1, in operation 110, three-dimensional (3D) surface height data of at least two tool strip marks are obtained by photographing tool strip marks generated using at least two tools with a 3D microscope.

Tool marks are marks formed by mutual contact of objects. The tool marks come in many forms, including impression and scratches. In this way, surface characteristics of the tool marks generated in various forms may be investigated to determine characteristics of the tools. According to an embodiment, a flat-blade screwdriver may be used as a tool to scrape the bottom made of metal, beeswax, or the like to form tool strip marks among the tool marks. Here, fine irregularities are formed on a surface of the tool strip marks in a stripe direction of the tool strip marks, so that the difference in surface heights of the tool strip marks may be observed. In this way, surface height data of the tool strip marks may be obtained by measuring a slight difference in the surface heights in the stripe direction of the tool strip marks. Here, the tool strip marks may be generated using at least two tools.

Referring to FIG. 2, operation 110 is specifically as follows. Operation 110 may include operation 112 of generating a 3D planar image of the tool strip marks by photographing the tool strip marks generated using the at least two tools with the 3D microscope, operation 114 of converting the 3D planar image of the tool strip marks into a 3D stereoscopic image of the tool strip marks by performing a 3D plotting process, and operation 116 of converting the 3D stereoscopic image of the tool strip marks into the surface height data of the tool strip marks.

In operation 112, the 3D planar image of the tool strip marks are generated by photographing the tool strip marks generated using the at least two tools with the 3D microscope. Since the tool strip marks are actually formed in three dimensions rather than planes, by using a 3D microscope, information about tool strip marks may be obtained more precisely than when using a two-dimensional microscope.

Figure 3:
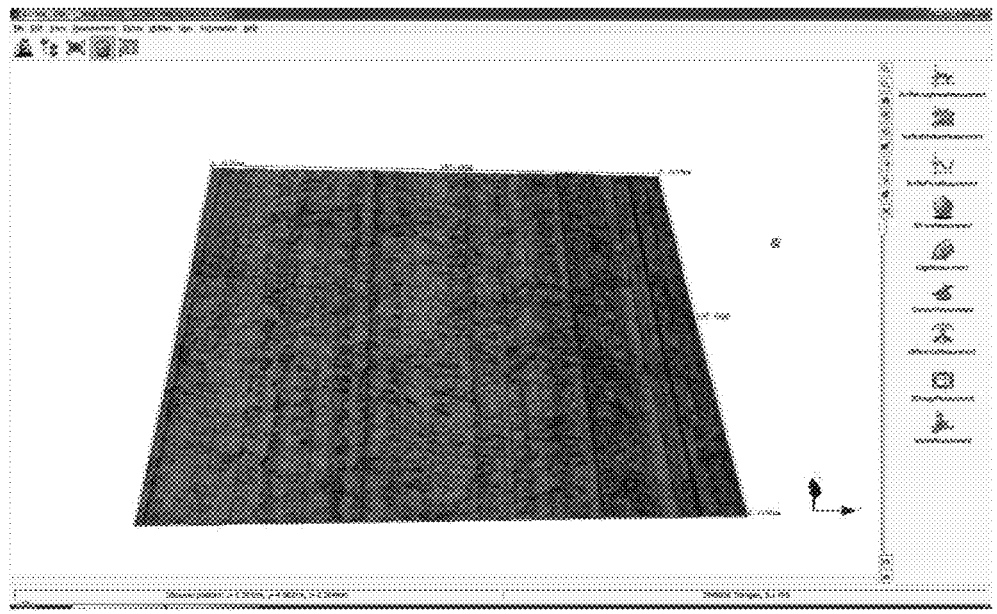
FIG. 3 is a view of a three-dimensional (3D) planar image of tool strip marks taken under a 3D microscope, according to an embodiment.

FIG. 3 is a view of a 3D planar image of tool strip marks taken under a 3D microscope, according to an embodiment. Referring to FIG. 3, the 3D planar image of the tool strip marks taken under the 3D microscope may be confirmed. Here, in the 3D planar image of the tool strip marks as shown in FIG. 3, the difference in surface heights of the tool strip marks is represented on the plane as the difference in color and brightness.

In operation 114, the 3D planar image of the tool strip marks obtained by photographing with the 3D microscope is 3D plotted to be converted into a 3D stereoscopic images of the tool strip marks.

Figure 4:
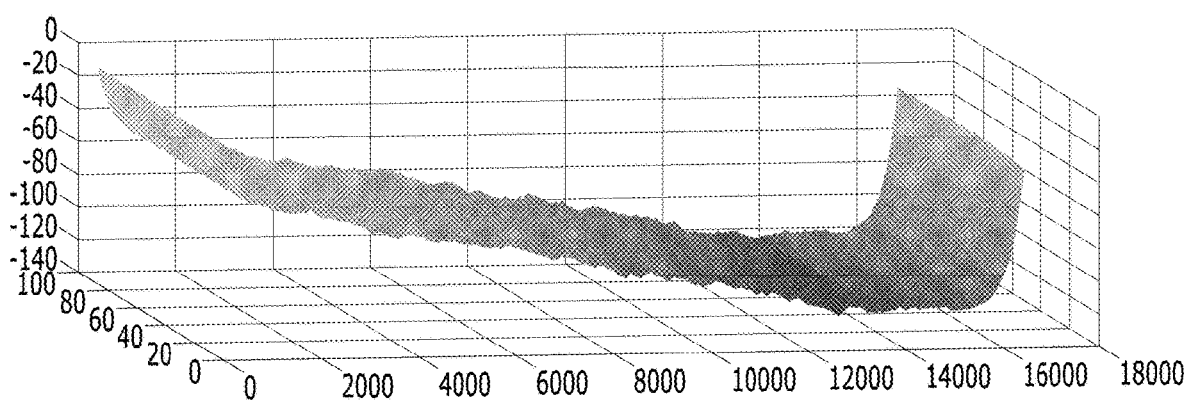
FIG. 4 is a view of a 3D stereoscopic image of tool strip marks converted according to an embodiment.

FIG. 4 is a view of a 3D stereoscopic image of tool strip marks converted according to an embodiment. The 3D planar image of the tool strip marks obtained by photographing with a 3D microscope shown in FIG. 3 may be converted into the 3D stereoscopic image of the tool strip marks as shown in FIG. 4. In the 3D planar image of the tool strip marks in the drawings, the difference in surface heights of the tool strip marks may be represented on the plane as the difference in color and brightness. However, in the 3D stereoscopic image of the tool strip marks, the difference in the surface heights of the tool strip marks is represented not only as the difference in color and brightness, but also in three dimensions. Here, the 3D planar image of the tool strip marks may be converted into the 3D stereoscopic image of the tool strip marks through a 3D plotting process, and the surface heights of the tool strip marks may be three-dimensionally displayed with an accurate value. For example, a Matlab's meshgrid function may be used for conversion of the 3D stereoscopic image of the tool strip marks. Here, in the conversion of the 3D stereoscopic image of the tool strip marks, configurations and methods of a 3D plotting process which may three-dimensionally express the difference in surface heights of the tool strip marks include all configurations and methods applicable by one of ordinary skill in the art.

In operation 116, the 3D stereoscopic image of the tool strip marks is converted into surface height data of the tool strip marks. Using the 3D stereoscopic image of the tool strip marks, the surface heights of the tool strip marks measured in a direction in which lengths of the tool strip marks are increased may be averaged and converted into the surface height data.

Figure 5:
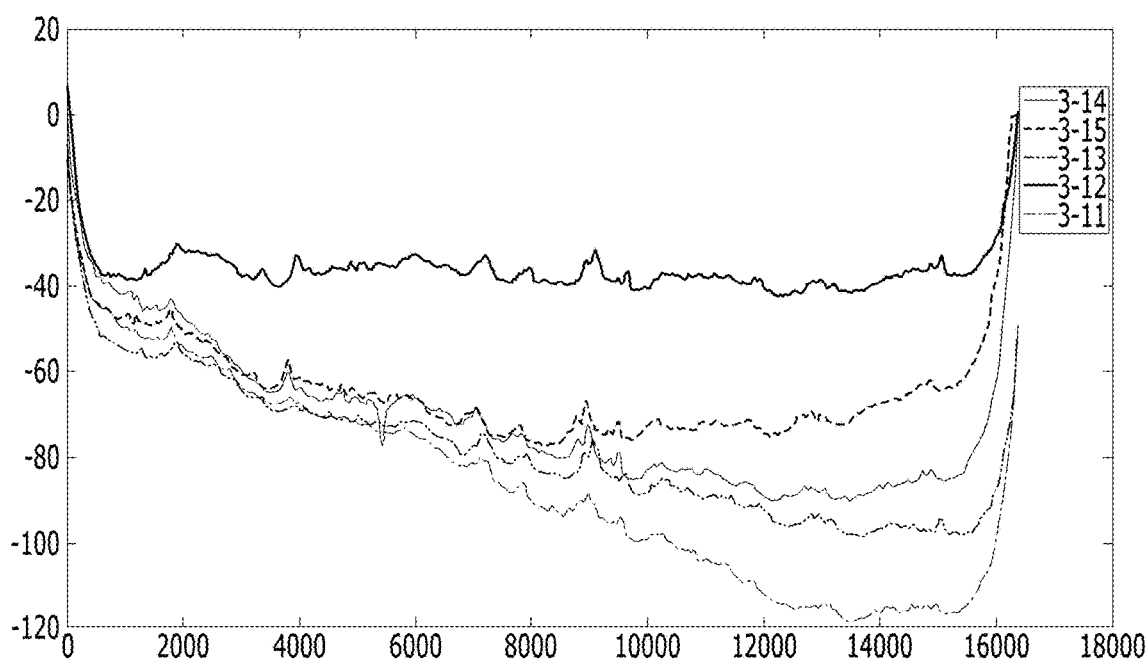
FIG. 5 is a view of surface height data of tool strip marks obtained according to an embodiment.

FIG. 5 is a view of surface height data of tool strip marks obtained according to an embodiment. FIG. 5 shows surface height data of at least two tool strip marks, which is measured in a direction in which lengths of the tool strip marks are increased.

In operation 120, a data set is generated by calculating a cross-correlation coefficient for the surface height data of the tool strip marks.

The cross-correlation coefficient is an indicator of statistical similarity between two or more different data sets. The cross-correlation coefficient has a value of 1 when two pieces of data are completely identical and a value of 0 when two pieces of data are not completely identical. As such, the cross-correlation coefficient is expressed as a value between 0 and 1, depending on the statistically similar degree.

Here, the tool strip marks may be generated using at least two tools. When generating the tool strip marks, two or more tool strip marks may be generated using the same tool or different tools. Here, it is possible to determine whether the tool strip marks are identical by confirming the cross-correlation coefficient for the surface height data of the at least two tool strip marks.

Figure 6:
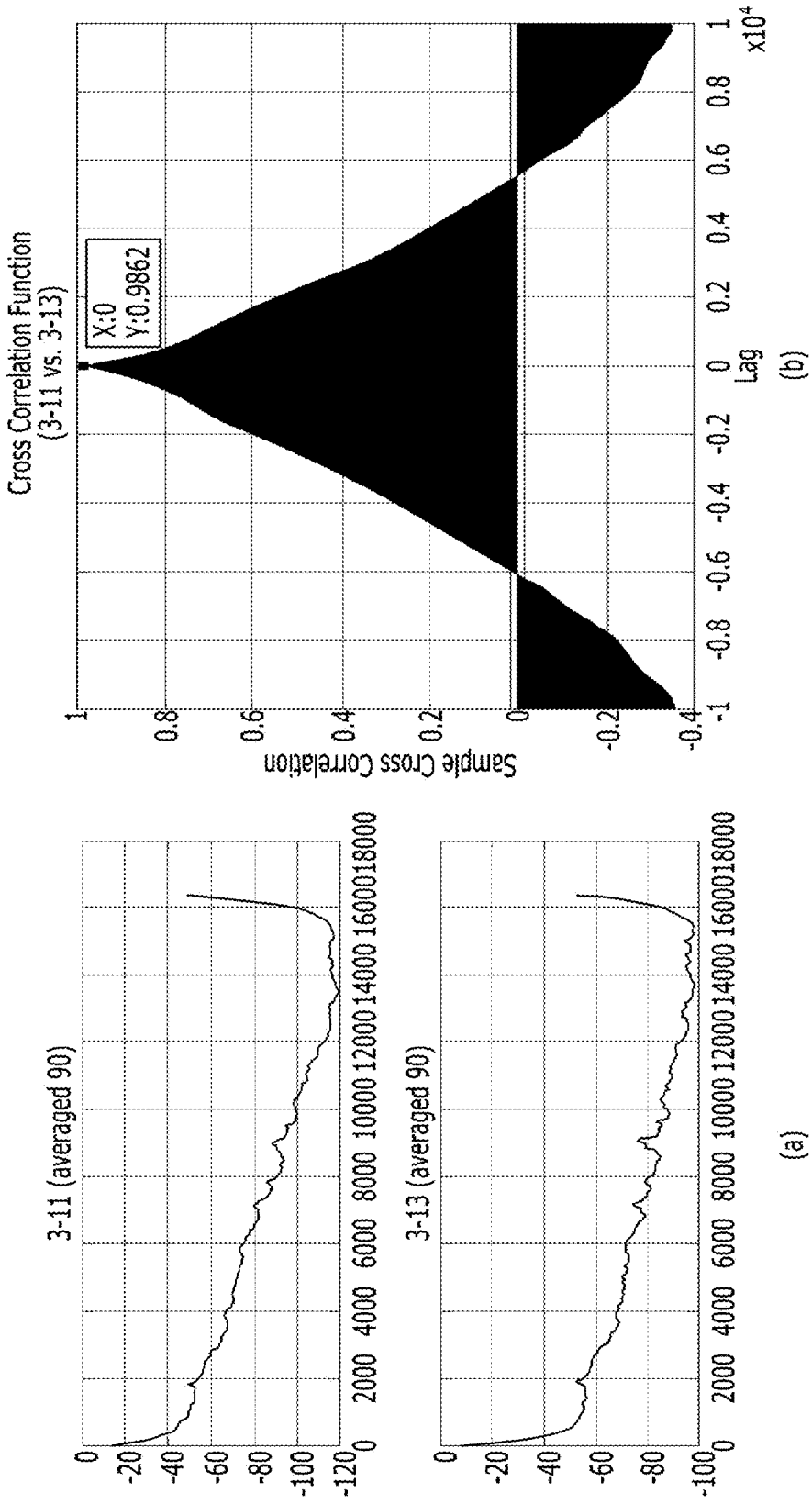
FIG. 6 is a view of calculating a cross-correlation coefficient for surface height data of tool strip marks, according to an embodiment.

FIG. 6 is a view of calculating a cross-correlation coefficient for surface height data of tool strip marks, according to an embodiment.

FIG. 6 (a) illustrates surface height data of two tool strip marks obtained according to an embodiment. FIG. 6 (b) shows the cross-correlation coefficient for the surface height data of the two tool strip marks of FIG. 6 (a). Here, the cross-correlation coefficient between the surface height data of the two tool strip marks is 0.9862, indicating that similarity of the surface height data of the two tool strip marks is high.

In more detail, two tool strip marks may be generated by a first tool, and two tool strip marks may be generated by a second tool. In addition, two tool strip marks may be generated by the first tool and the second tool.

Here, the cross-correlation coefficient set AA for the surface height data of the two tool strip marks generated by the first tool, the cross-correlation coefficient set BB for the surface height data of the two tool strip marks generated by the second tool, and the cross-correlation coefficient set AB for the surface height data of the tool strip marks respectively generated by the first tool and the second tool may be generated. Here, all of the plurality of tool strip marks generated by the first tool may be generated by applying a constant force. In addition, all of the plurality of tool strip marks generated by the second tool may be generated by applying a constant force.

Each of data sets generated based on the cross-correlation coefficient sets AA, BB, and AB may be generated by storing each cross-correlation coefficient in a first column, and by storing a value of 1 in the case of tool strip marks generated by the same tool and a value of 0 in the case of tool strip marks generated by different tools in a second column.

In operation 130, the data set is separated into a training set for machine learning training and a test set for verifying a machine learning result. The data set may be divided into a training set and a test set and separated at a constant rate. For example, the training set and the test set may be separated at a constant ratio of 6 to 4, and a separation ratio of the training set and the test set may be changed depending on a situation. Here, it may be efficient to have a relatively small proportion of the test set than the training set.

In operation 140, the machine learning training is performed to determine whether the tool strip marks are identical using the training set. Here, for example, a linear discriminant analysis may be performed for determining whether the tool strip marks are identical using a Matlab's classification learner.

Figure 7:
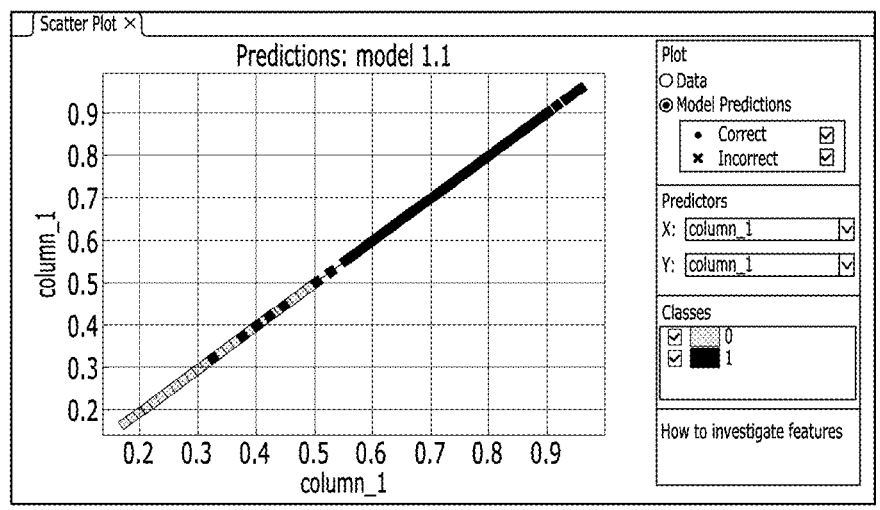
FIG. 7 is a view of a process of machine learning training according to an embodiment.

FIG. 7 is a view of a process of machine learning training according to an embodiment. Referring to FIG. 7, a Matlab's classification learner may train a training set to be classified according to certain criteria. Here, a cross-correlation coefficient may be used as a feature of the classification. For example, when the Matlab's classification learner is used to train how to determine whether the tool strip marks are identical, it may be determined and classified that the tool strip marks are identical when a cross-correlation coefficient for surface height data of the tool strip marks is 0.5 or more, and that the tool strip marks are not identical when a cross-correlation coefficient for surface height data of the tool strip marks is 0.5 or less. A result of the machine learning training performed in determining whether the tool strip marks are identical may be confirmed using accuracy. Here, the accuracy is an indicator for indicating the ratio of whether data is properly classified.

In addition, a training set classified by performing a linear discriminant analysis as shown in FIG. 7 may be projected on a specific axis and displayed by a straight line represented by two types.

In operation 150, the test set is used to verify the result of the machine learning training. That is, after performing the machine learning training using the training set, the result of the machine learning training may be verified and confirmed using the test set.

Figure 8:
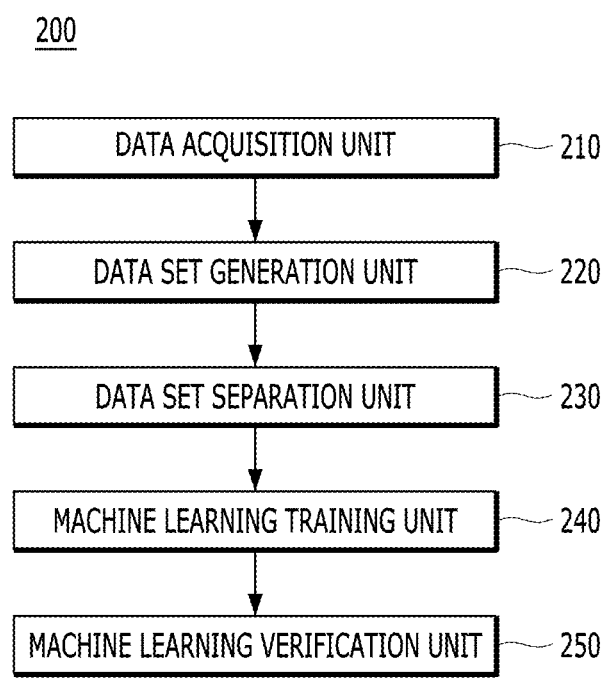
FIG. 8 is a block diagram of an apparatus for determining tool mark identity using machine learning, according to an embodiment.
Figure 9:
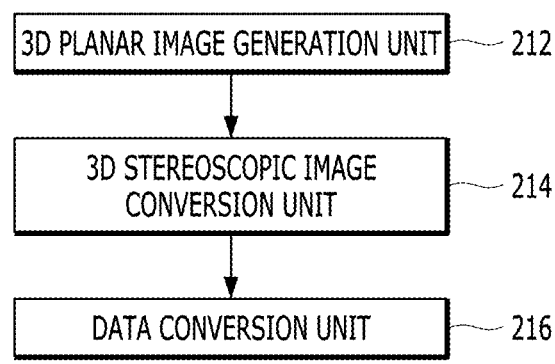
FIG. 9 is a block diagram of a data acquisition unit of FIG. 8.

FIG. 8 is a block diagram of an apparatus for determining tool mark identity using machine learning, according to an embodiment. FIG. 9 is a block diagram of a data acquisition unit of FIG. 8.

Referring to FIG. 8, a tool mark identity determination apparatus 200 using machine learning according to an embodiment may include a data acquisition unit 210, a data set generation unit 220, a data set separation unit 230, a machine learning training unit 240, and a machine learning verification unit 250.

The data acquisition unit 210 may obtain surface height data of at least two tool strip marks by photographing tool strip marks generated using at least two tools with a 3D microscope.

Referring to FIG. 9, the data acquisition unit 210 may include a 3D planar image generation unit 212, a 3D stereoscopic image conversion unit 214, and a data conversion unit 216.

The 3D planar image generation unit 212 may generate a 3D planar image of the tool strip marks by photographing the tool strip marks generated using the at least two tools with the 3D microscope.

The 3D stereoscopic image conversion unit 214 may convert the 3D planar image of the tool strip marks into a 3D stereoscopic image of the tool strip marks by performing 3D plotting.

The data conversion unit 216 may convert the 3D stereoscopic image of the tool strip marks into surface height data of the tool strip marks.

The data set generation unit 220 may generate a data set by calculating a cross-correlation coefficient of the surface height data of the 3D tool strip marks.

In more detail, the cross-correlation coefficient set AA for the surface height data of the two tool strip marks generated by the first tool, the cross-correlation coefficient set BB for the surface height data of the two tool strip marks generated by the second tool, and the cross-correlation coefficient set AB for the surface height data of the tool strip marks respectively generated by the first tool and the second tool may be generated. Here, all of the plurality of tool strip marks generated by the first tool may be generated by applying a constant force. In addition, all of the plurality of tool strip marks generated by the second tool may be generated by applying a constant force.

Each of data sets generated based on the cross-correlation coefficient sets AA, BB, and AB may be generated by storing each cross-correlation coefficient in a first column, and by storing a value of 1 in the case of tool strip marks generated by the same tool and a value of 0 in the case of tool strip marks generated by different tools in a second column.

The data set separation unit 230 may separate the data set into a training set for performing machine learning and a test set for verifying a machine learning result.

The machine learning training unit 240 may perform machine learning training to determine whether the tool strip marks are identical using the training set.

The machine learning verification unit 250 may verify a result of the machine learning training using the test set.

The tool mark identity determination apparatus 200 using machine learning according to an embodiment shows only components associated with the present embodiment in order to prevent features of the present embodiment is blurred. Accordingly, it is to be understood by one of ordinary skilled in the art that other general-purpose components may be further included in addition to the components shown in FIGS. 8 and 9.

Figure 10:
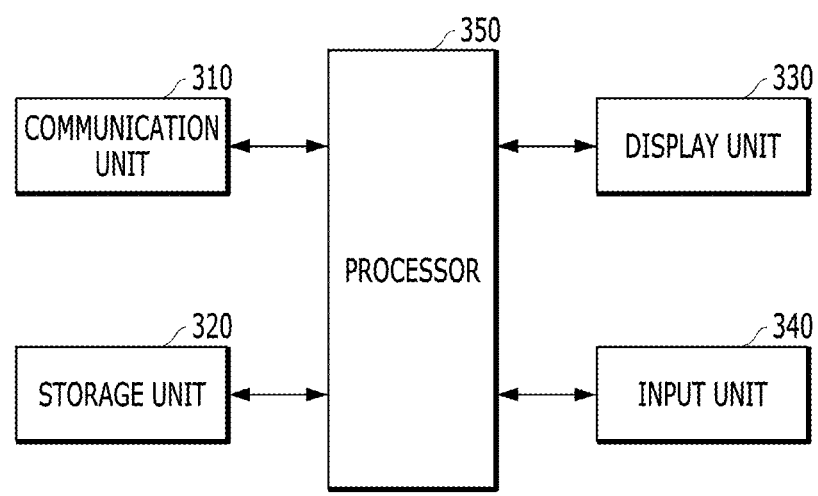
FIG. 10 is a block diagram of an exemplary computer device for implementing an embodiment.

FIG. 10 is a block diagram of an exemplary computer device for implementing an embodiment. In addition, terms such as " . . . unit" refer to units that perform at least one function or operation, and the units may be implemented as hardware or software or as a combination of hardware and software.

Referring to FIG. 10, a computer device 300 may include a communication unit 310, a storage unit 320, a display unit 330, an input unit 340, and a processor 350.

The communication unit 310 provides an interface for communicating with other systems or devices. For example, the communication unit 310 may include an interface device used to connect with a network interface card, Ethernet, a token ring, or another type of physical coupling material that enables communication via an external network. For example, the communication unit 310 may perform signal processing for accessing a wireless network. The computer device 300 may be connected to a number of clients and servers through conventional network infrastructure, such as the Internet. For example, the communication unit 310 may perform signal processing for accessing a wireless network.

The storage unit 320 may store data such as a basic program, an application program, and setting information for the operation of the computer device 300. The storage unit 320 may be configured of a volatile memory, a non-volatile memory, or a combination of the volatile memory and the nonvolatile memory. In addition, the storage unit 320 may provide data stored at the request of the processor 350.

The display unit 330 performs functions for outputting information in the form of numbers, letters, images, graphics, and the like. To this end, the display unit 330 may include at least one hardware module for output. For example, the hardware module may include at least one of a liquid crystal display (LCD), a light emitting diode (LED), a light emitting polymer display (LPD), an organic LED (OLED), an active matrix OLED (AMOLED), and a flexible LED (FLED). That is, the display unit 330 may display a screen corresponding to data received from the processor 350. The display unit 330 may be referred to as an output unit or another term having an equivalent technical meaning.

The input unit 340 detects an input from the outside (e.g., a user) and provides data corresponding to the input to the processor 350. To this end, the display unit 330 may include at least one hardware module for detecting the input. For example, the hardware module may include at least one of a sensor, a keyboard, a keypad, a touch pad, and a touch panel. According to an embodiment, when the input unit 340 is implemented as a touch panel, the input unit 340 may be combined with the display unit 330 to provide a touch screen. In this case, the input unit 340 may provide data about a user's touch input to the processor 350.

The processor 350 controls the overall operations of the computer device 300. For example, the processor 350 transmits and receives a signal through the communication unit 310. In addition, the processor 350 writes and reads data in the storage unit 320 and executes instructions stored in the storage 320. In addition, the processor 350 may display various screens through the display unit 330. Furthermore, the processor 350 may process data input through the input unit 340 and control an operation state of the input unit 340 as necessary. The processor 350 may include one or multiple processors.

Hereinabove, all components according to the embodiments are described to be combined as one or are described to operate by being combined with each other, but the disclosure is not limited thereto. In other words, at least two of the components may selectively combine to operate within the scopes of the disclosure.

Also, each of the components may be realized as independent hardware, or some or all of the components may be selectively combined to be realized as a computer program having a program module in which some or all functions are performed in one or more hardware. Codes, and code segments for configuring the computer program may be easily construed by one of ordinary skill in the art to which embodiments belong.

Such a computer program may be stored in a computer readable medium and read and executed by a computer, thereby implementing the embodiment. Examples of the computer readable medium of the computer program may be a magnetic recording medium, an optical recording medium, or the like.

Unless otherwise defined, all terms (including technical and scientific terms) used herein have the same meaning as commonly understood by one of ordinary skill in the art to which embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The description herein is for the purpose of describing the inventive concept and numerous modifications and adaptations will be readily apparent to one of ordinary skill in the art without departing from the spirit and scope of the disclosure.

In this regard, the present embodiments may have different forms and should not be construed as being limited to the descriptions set forth herein. While the disclosure has been particularly shown and described with reference to embodiments thereof, it will be understood that various changes in form and details may be made therein without departing from the spirit and scope of the following claims.

As described above, a method of determining tool mark identity 100 and the tool mark identity determination apparatus 200 using machine learning according to embodiments may provide a quantitative and unified discrimination criterion by obtaining a cross-correlation coefficient for surface height data of two tool strip marks and implementing a process of determining whether tool marks are identical by machine learning. In addition, according to the embodiments, by determining whether the tool marks are identical by machine learning, objective research and analysis of the tool mark identity may be performed more accurately to effectively contribute to the resolution of crime cases.

What is claimed is:

1. A method of determining tool mark identity using machine learning, the method comprising:
   obtaining surface height data of at least two tool strip marks by photographing tool strip marks generated using at least two tools with a three-dimensional (3D) microscope;
   generating a data set by calculating a cross-correlation coefficient for the surface height data of the tool strip marks;
   separating the data set into a training set for machine learning training and a test set for verifying a machine learning result;
   performing the machine learning training to determine whether the tool strip marks are identical using the training set; and
   verifying a result of the machine learning training using the test set.

2. The method of claim 1, wherein the obtaining of the surface height data of the tool strip marks comprises:
   generating a 3D planar image of the tool strip marks by photographing the tool strip marks generated using the at least two tools with the 3D microscope;
   converting the 3D planar image of the tool strip marks into a 3D stereoscopic image of the tool strip marks by performing a 3D plotting process; and
   converting the 3D stereoscopic image of the tool strip marks into the surface height data of the tool strip marks.

3. The method of claim 1, wherein the generating of the data set comprises:
   generating a cross-correlation coefficient set AA for surface height data of two tool strip marks generated by a first tool, a cross-correlation coefficient set BB for surface height data of two tool strip marks generated by a second tool, and a cross-correlation coefficient set AB for the surface height data of the two tool strip marks respectively generated by the first tool and the second tool, and each data set generated based on each of the cross-correlation coefficient sets is generated by storing the cross-correlation coefficient in a first column, and by storing a value of 1 in the case of tool strip marks generated by the same tool and a value of 0 in the case of tool strip marks generated by different tools in a second column.

4. The method of claim 1, wherein the performing of the machine learning training comprises:
   a linear discriminant analysis using a Matlab's classification learner.

5. An apparatus for determining tool mark identity using machine learning, the apparatus comprising:
   a data acquisition unit configured to obtain surface height data of at least two tool strip marks by photographing tool strip marks generated using at least two tools with a three-dimensional (3D) microscope;
   a data set generation unit configured to generate a data set by calculating a cross-correlation coefficient for the surface height data of the tool strip marks;
   a data set separation unit configured to separate the data set into a training set for machine learning training and a test set for verifying a machine learning result;
   a machine learning training unit configured to perform machine learning training to determine whether the tool strip marks are identical using the training set; and
   a machine learning verification unit configured to verify a result of the machine learning training using the test set.

6. The apparatus of claim 5, wherein the data acquisition unit comprises:
- a 3D planar image generation unit configured to generate a 3D planar image of the tool strip marks by photographing the tool strip marks generated using the at least two tools with the 3D microscope;
- a 3D stereoscopic image conversion unit configured to convert the 3D planar image of the tool strip marks into a 3D stereoscopic image of the tool strip marks by performing a 3D plotting process; and
- a data conversion unit configured to convert the 3D stereoscopic image of the tool strip marks into the surface height data of the tool strip marks.

7. The apparatus of claim 5, wherein the data set generation unit is configured to generate a cross-correlation coefficient set AA for surface height data of two tool strip marks generated by a first tool, a cross-correlation coefficient set BB for surface height data of two tool strip marks generated by a second tool, and a cross-correlation coefficient set AB for the surface height data of the two tool strip marks respectively generated by the first tool and the second tool, and each data set generated based on each of the cross-correlation coefficient sets is generated by storing the cross-correlation coefficient in a first column, and by storing a value of 1 in the case of tool strip marks generated by the same tool and a value of 0 in the case of tool strip marks generated by different tools in a second column.

\* \* \* \* \*